Aug. 5, 1924.
E. T. BROS
SHOCK ABSORBER
Filed April 11, 1921
1,503,881
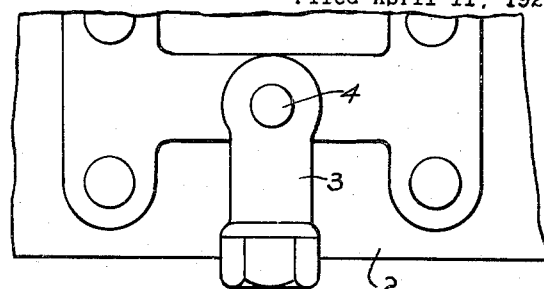
FIG.1
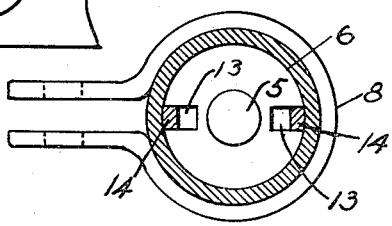
FIG.2
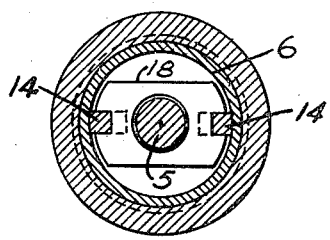
FIG.3
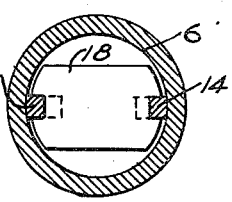
FIG.4
FIG.5
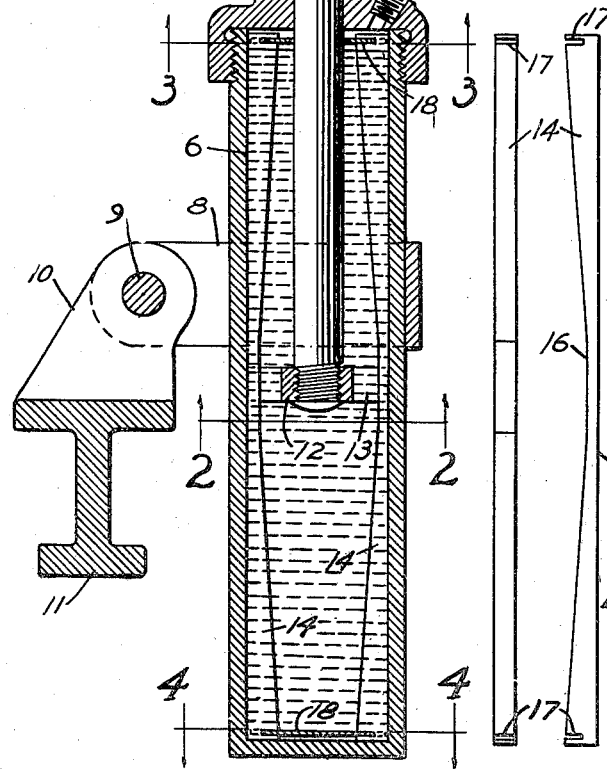
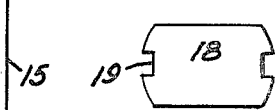
FIG.6
FIG.7
Inventor
ERNEST T. BROS
BY Paul Paul
His Attorneys Patented Aug. 5, 1924.

1,503,881

UNITED STATES PATENT OFFICE.

ERNEST T. BROS, OF MINNEAPOLIS, MINNESOTA.

SHOCK ABSORBER.

Application filed April 11, 1921. Serial No. 460,307.

*To all whom it may concern:*

Be it known that I, ERNEST T. BROS, a citizen of the United States, resident of Minneapolis, county of Hennepin, State of Minnesota, have invented certain new and useful Improvements in Shock Absorbers, of which the following is a specification.

The object of my invention is to provide a shock absorber adapted for use on motor driven or other vehicles for regulating the movement of the vehicle body when traveling over rough or uneven streets and roads and jar to the occupants of the vehicle.

A further object is to provide a shock absorber which will have a smooth, even stroke under all conditions of use and wear.

The invention consists generally in various constructions and combinations, all as hereinafter described and particularly pointed out in the claims.

In the accompanying drawings forming part of this specification,

Figure 1 is a view, partially in section, of a shock absorber embodying my invention, Figure 2 is a sectional view on the line 2—2 of Figure 1, Figure 3 is a sectional view on the line 3—3 of Figure 1, Figure 4 is a sectional view on the line 4—4 of Figure 1, Figure 5 is a detailed view of one of the plates at the end of the cylinder connecting the bars running lengthwise therein.

Figure 6 is an edge view of one of the bars,

Figure 7 is a side view,

In the drawing, 2 represents a portion of a vehicle body, 3 a coupling pivoted at 4 on the body and having a threaded connection with a piston rod 5, which projects into a cylinder 6 through a suitable stuffing box 7. A strap 8 encircles the cylinder and has a pivotal connection at 9 with an ear 10 on the axle 11. These are merely conventional means of connecting the shock absorbing device with the vehicle and the axle. Any other suitable connecting device may be employed, if preferred. Within the cylinder is a piston 12 having recesses 13 in its periphery extending radially therein. Bars 14 are fitted within the cylinder having flat surfaces 15 seated against the inner walls of the cylinder upon opposite sides of the piston, said bars being of suitable width to fit the recesses 13 and bear on the walls thereof allowing the piston, however, to slide freely back and forth in the cylinder. The inner faces of the bars are concave, as indicated at 16, decreasing in cross sectional area from the ends towards the middle, so that when the piston is in the position shown in Figure 1, near the center of the cylinder, it will be opposite the narrower portion of the bars and spaces will be provided between the bars and the bottoms of the recesses. A suitable fluid, such as oil, is provided within the cylinder and when the piston moves, the oil will flow through the recess 13 from one side to the other of the piston and evidently when the piston is at the center of its stroke, the passage will be larger and the oil or other fluid may flow more freely. When, however, the piston aproaches the ends of the cylinder, the recesses will be decreased in area, owing to the increase in cross sectional area of the bars until a point is reached when the ends of the bars near the recesses or passages will be entirely closed and at that time the flow of the fluid through the piston will be shut off. At each end the bars are preferably provided with narrow slits or slots 17 and comparatively thin plates 18 are provided, having end recesses 19 to receive the ends of the bars, as indicated in Figure 1 and hold them in their proper relative position in the cylinder. These plates 18 have preferably parallel side edges and do not extend entirely across the cylinder, allowing the free circulation of the fluid around them.

In the operation of the device, a quantity of oil, or other suitable fluid, is placed in the cylinder, the plug 20 being removed for this purpose, and the lower portion of the cylinder will be filled by gravity, the fluid flowing through the passages in the piston so that when a downward thrust is exerted on the rod 5, the fluid will yieldingly resist downward movement of the piston and flowing upwardly through the recesses, will allow the piston to gradually settle to the bottom of the cylinder. Upward pull on the piston will have the same effect, the oil flowing freely at the start and the area of the passage through the piston gradually decreasing as it moves toward either end of the cylinder. In this way the movement of the vehicle is regulated and cushioned and jolt and jar to the occupants of the vehicle, resulting from rough or uneven roads, will be eliminated.

I claim as my invention:

1. A shock absorber comprising a cylinder adapted to contain an inelastic fluid, a piston having radial openings in its periphery upon opposite sides of the center thereof, bars fitting said openings and the inner walls of said cylinder in opposing relation said piston being free to slide on said bars, and said bars increasing gradually in cross-sectional area from the middle portions thereof toward each end, the openings of said piston being substantially closed by said bars when said piston is near the ends of said cylinder, and passages being formed through said openings for the flow of the inelastic fluid when the piston is near the middle of said cylinder opposite the point of minimum diameter of said bars, and means interposed between the ends of said bars and seated therein for holding said bars in opposing relation.

2. A shock absorber comprising a cylinder adapted to contain an inelastic fluid, a piston having radial openings in its periphery upon opposite sides of the center thereof, bars seated against the inner walls of said cylinder and in opposing relation and projecting into the openings in said piston, and said piston being free to slide on said bars, and said bars increasing gradually in cross-sectional area from the middle portion thereof toward each end, the openings in said piston being substantially closed by said bars when said piston is near the ends of the cylinder, and passages formed through said openings for the flow of the inelastic fluid when the piston is near the middle of said cylinder opposite the point of minimum diameter of said bars, and said bars being removable from said cylinder.

3. A shock absorber comprising a cylinder adapted to contain an inelastic fluid, a piston having radial slots in its periphery upon opposite sides of the center thereof, bars having their outer longitudinal edges seated against the inner walls of said cylinder and in opposing relation, the inner longitudinal edges of said bars projecting into the slots in said piston, and said piston being free to slide on said edges, and said bars increasing gradually in cross-sectional area from the middle portions thereof toward each end, the slots in said piston being substantially closed by said bars when said piston is near the ends of the cylinder, and passages being formed through said slots for the flow of the inelastic fluid when the piston is near the middle of the cylinder opposite the point of minimum diameter of said bars, and means interposed between the ends of said bars and seated therein and operating to hold said bars in opposing relation but permitting their convenient removal from said cylinder.

4. A shock absorber comprising a cylinder adapted to contain an inelastic fluid, a piston having radial slots in its periphery upon opposite sides of the center thereof, bars substantially rectangular in cross section, having their outer longitudinal edges seated against the inner walls of said cylinder and in opposing relation, the inner longitudinal edges of said bars projecting into the slots in said piston and said piston being free to slide on said edges and said bars increasing gradually in cross sectional area from the middle portions thereof toward each end, the slots in said piston being substantially closed by said bars when said piston is near the ends of the cylinder, and passages being formed through said slots for the flow of the inelastic fluid when the piston is near the middle of the cylinder opposite the point of minimum diameter of said bars, and plates interposed between the ends of said bars and seated in slots therein and operating to hold said bars in opposing relation but permitting their convenient removal from said cylinder.

In witness whereof, I have hereunto set my hand this 4th day of April, 1921.

ERNEST T. BROS.